Oct. 6, 1931.                M. L. HANAHAN                1,826,131
                LITHOPONE AND PROCESS OF MAKING SAME
                    Filed Jan. 24, 1927      2 Sheets-Sheet 1

Marion L. Hanahan  Inventor

By his attorney

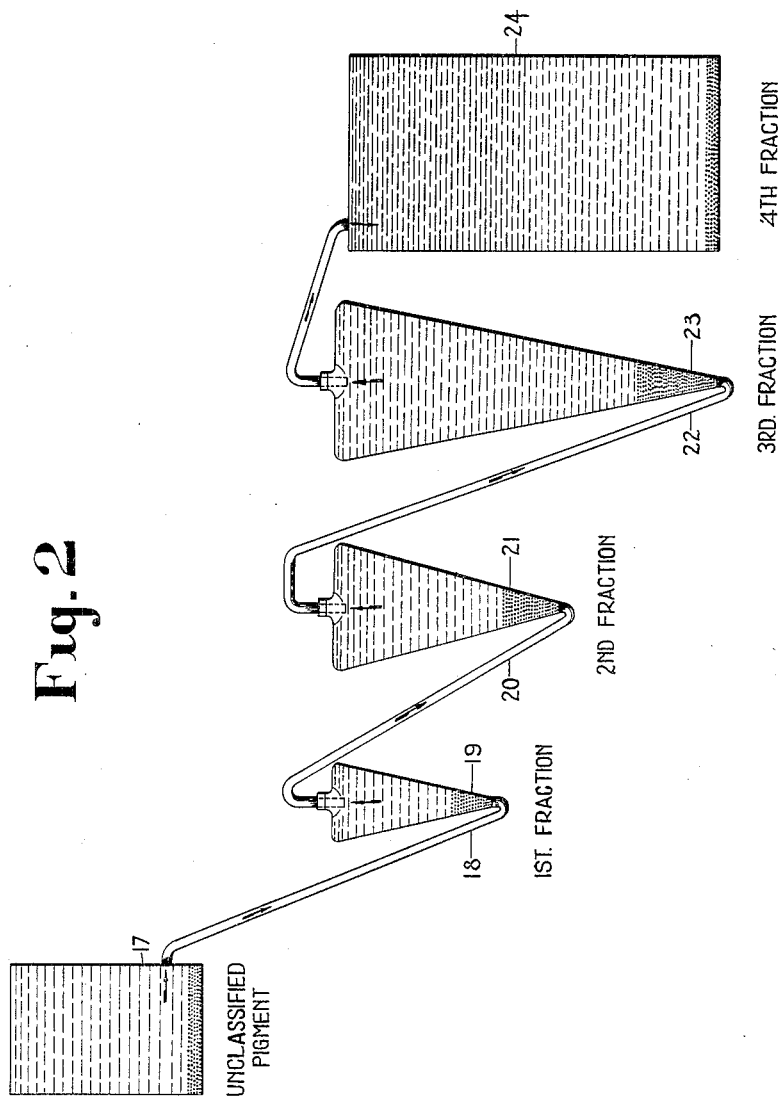

Patented Oct. 6, 1931

1,826,131

UNITED STATES PATENT OFFICE

MARION L. HANAHAN, OF NEWARK, NEW JERSEY, ASSIGNOR, BY MESNE ASSIGNMENTS, TO KREBS PIGMENT & COLOR CORPORATION, OF WILMINGTON, DELAWARE, A CORPORATION OF DELAWARE

LITHOPONE AND PROCESS OF MAKING SAME

Application filed January 24, 1927. Serial No. 163,213.

This invention relates to a new type of lithopone having a very fine texture, and to a process of manufacturing it.

Heretofore the customary procedure in making lithopone has been to mix together solutions of barium sulphide and zinc sulphate respectively, filter, dry, and calcine the resulting precipitate. The calcined pigment is quenched and the resulting water slurry is ground on burrstone mills or pebble mills or any of the standard types of wet grinding equipment. The slurry is then washed by settling and decantation, filtered, dried, and dry ground. The degree of wet grinding of the quenched lithopone is usually such that over 99% should pass thru a 200 mesh screen. In the case of the more recent lithopone production the fraction frequently runs over 99.7% thru 325 mesh. The properties of pigments, for example, in a paint or enamel film are affected by particles small enough to pass thru even a 325 mesh screen. A pigment which passes this mesh almost completely may often have 5 to 20% by weight of particles that will be visible in a paint film and cause surface irregularities which are particularly objectionable in gloss or enamel paints. For this reason lithopone has not been used to any great extent in enamels even tho its superior hiding power over other pigments would recommend it for this purpose.

The invention comprises the elutriation of a liquid or aqueous suspension of the ground pigment preferably containing a suitable dispersing agent to eliminate flocculation of the particles during the elutriation. The elutriation separates the pigment into two or more (as many as desired) fractions of successively decreasing particle size, which fractions exhibit different properties and are specially adapted on this account for particular uses. The finer fractions are especially suited for enamels and gloss paints, and the coarser fractions are particularly well suited for making flat paints. Each fraction is much better adapted to the purpose mentioned than is the original lithopone.

The suspension of lithopone in water is obtained by grinding lithopone in a suitable equipment and treating it with a dispersing agent such as water glass (sodium silicate). The function of the dispersing agent is to defocculate and disperse the lithopone particles so that they may be separated by settling out according to their particle size. The alkalinity of the aqueous suspension is advantageously not less than the equivalent of a pH of 5.5. In some cases the alkalinity of sodium silicate is itself sufficient, but where it is not the pH is preferably brought to the desired value by the addition of sodium hydroxide or other alkali. The preferred pH is 9.0.

The slurry should not be too concentrated as high concentration of solids interferes with the separation of the coarse and fine particles. The preferred concentration for the feed slurry is 15 parts of water to 1 of lithopone, altho this may be varied from 8 to 1 up to any desired higher value. The concentration is important, however, only in the actual separation zone where the fines are traveling upwardly and the coarse material downwardly. At this point the preferred maximum concentration should be 20 to 1, but a range down to 12 to 1 may be used. The slurry after treatment is fed into a suitable type of clutriating vessel, such as is used in the mining and metallurgical industries, for the separation of minerals of different particle size or specific gravity. The Callow Cone and the Door Co. hydro-separators are examples of this type of equipment. The process may, however, be conducted in an ordinary tank or vessel wherein the inlet and outlet openings are suitably arranged.

The suspension of lithopone enters the separating vessel and flows upwardly thru it to the outlet, the flow being regulated to a rate at which the objectionable larger particles will settle out and only the desired finely divided pigment is retained in the outflow. The coarse rejects may be ground and again passed thru the separator for a greater recovery or may be used in paints directly. The overflow may be subjected to a second similar separation or it may be collected and finished as follows:—The outflow of the fine pigment suspension is collected by either of two methods (a)—by settling it in a larger vessel, or (b)—by coagulation to increase the rapidity of settling followed by settling it in a vessel of suitable size. When sodium silicate is used for dispersion the coagulation may be accomplished by increasing the hydrogen ion concentration to pH=4, using any suitable acid such as $H_2SO_4$.

From this point on, the pigment may be finished, dried, and dry ground in the usual manner. The dry grinding is preferably very thoro to realize in the dry state the inherent fineness of the product. This will break up the press cake particles.

In a well dispersed suspension such as is obtained with 0.5% water glass, the size of particle carried over the top of the elutriating vessel is proportional to the vertical velocity of the suspension; or for a vessel of given dimensions it is proportional to the volume of suspension flowing upwardly in a given time. I have found that for enamels a pigment of suitable particle size is obtained in an aqueous suspension which has been passed upwardly thru an elutriator at a rate of 3 ft. per hour or less. The slower the rate the finer is the resulting overflow suspension, as a general proposition. The rate of flow may be 6 feet per hour or less to obtain lithopone of a fine, smooth texture. Pigment which settles out from an aqueous liquid at velocities from 3 to 12 ft. per hour but overflows at velocities higher than this is best adapted to making flat paints of the interior wall finish types. These rates apply when the temperature is 20° C. If the temperature is increased, the rates of flow may be increased because of the increased rate of settling.

For example, I have prepared a slurry of 7 parts lithopone; 93 parts water; 0.035 parts sodium silicate approximating 40° Bé.; in a mixing tank. The slurry is fed at a constant rate of flow (e. g., 100 gal. per min,) to a 15 ft. diameter Dorr hydro-separator. From the bottom of the hydro-separator the coarse fraction of lithopone is removed at the rate of 10 gal. per minute of slurry consisting of 2 parts water to 1 part lithopone.

The overflow of finely divided lithopone is at the rate of 90 gal. per minute and the concentration is about 22 parts water to 1 of lithopone. The overflow suspension containing the desirable fraction of the pigment is pumped to a 12' x 12' wooden tank when it is acidified with sulfuric acid to a pH of 4. After this it is pumped to a Dorr thickener, where it is concentrated by settling to a slurry of 1.5 parts water to 1 part lithopone. It is then finished in the regular manner, including filtration drying, drying and dry grinding in a Stedman disintegrator.

The finely divided product of this invention when ground in oils to make paint exhibits a smooth texture similar to that obtained with high grade fume pigments such as zinc oxide, etc. Its fineness is generally such that over 99.7% will pass thru a 325 mesh screen, and the per cent may run nearly to 100%. The large particles normally present in the prior art lithopones are absent in my new product. Paint and enamel films containing lithopone of this new type present a smooth unbroken surface as compared with the rough surfaces, having numerous projecting particles, obtained by the use of prior art lithopones. The new product may be used in rubber, and in leather manufacture, where fine texture is desired.

The coarser product of this invention is particularly well adapted to the preparation of flat wall paints and finishes where the absence of gloss is desirable.

As stated, various devices may be adopted for carrying out the process of obtaining the new lithopone product. By way of example, two forms of apparatus are shown.

Figure 2 represents the side elevation of a simple apparatus showing how various grades of product may be obtained.

Figure 1:
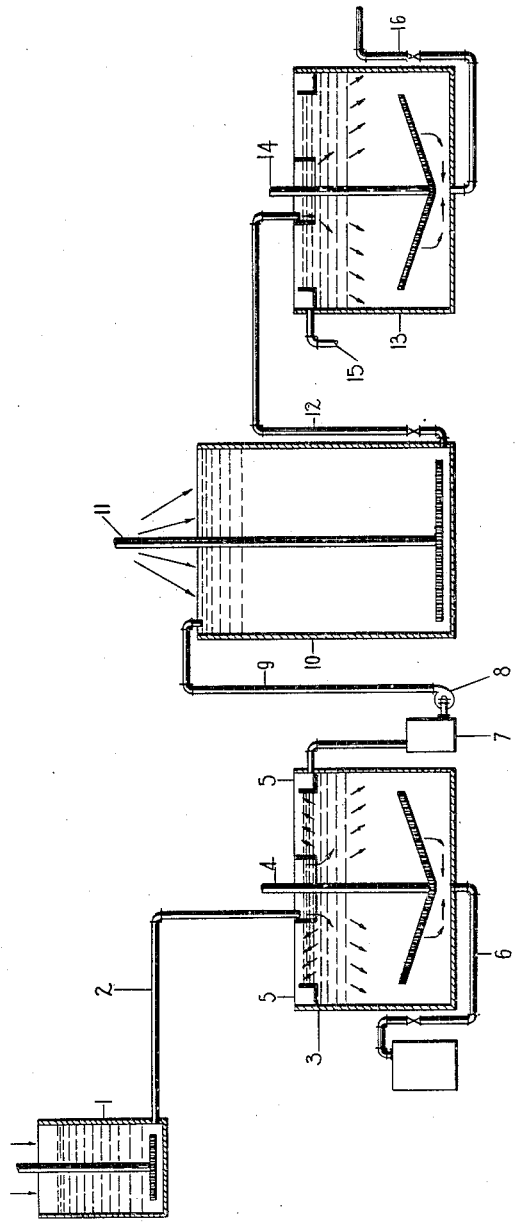
Figure 1 represents the side elevation of a plant equipment.

In said Figure 1 there is shown a mixing tank (1) for lithopone and water provided with a conduit (2) to conduct the mixture to a hydro-separator (3), which is provided with an agitating device (4), an overflow trough (5) and a conduit (6) for conveying away the coarse fraction separated out. The overflow empties into a tank (7) where a centrifugal pump (8) forces the liquid thru conduit (9) into a tank (10). Tank (10) contains agitating device (11) and is designed to receive a sulphuric acid spray to mix with the liquid therein. A conduit (12) leads to tank (13), called a thickener, which is provided with an agitating device (14), an overflow trough (15) and a bottom delivery pipe or conduit (16) that conveys away the thick slurry fines. The trough (15) is for the clear aqueous or other clear liquid overflow.

The operation of this device will probably be evident from the previous description. It consists in introducing lithopone and water plus a dispersing agent, such as sodium silicate solution, into the tank (1) and mixing it therein. The mixture is conducted into tank 3 where the upward flow at a definite and constant rate permits separation of the particles according to their respective sizes. The introduction of liquid through conduit (2), of course, causes an overflow into trough (5) and the rate of introduction of liquid will determine the rate at which the column of liquid in tank (3) moves upwardly as a whole, that is, the number of feet per hour movement of the body or column. Whatever agitation is carried out is not so violent as to prevent the particles from either settling or remaining in suspension according to their respective sizes. The overflow, therefore, containing the fine particles passes on thru conduit (9) into tank (10) where the alkalinity is reduced for the purpose of coagulating the particles, as heretofore described. The coagulated pigment is passed into the tank (13), preferably agitated therein, and collected at the bottom of the tank thru conduit (16), whereas the clear water or other liquid used goes into the overflow (15). It will be seen that the operation of tank (13) is different from tank (3), as in the latter the overflow contains the desired fine pigment, whereas in tank (13) the overflow is clear liquid. The thick slurry fines obtained thru conduit (16) comprises the desired fine texture product, so that by removing the liquid and washing, if desired, the dry lithopone may be obtained. The coarse fraction obtained thru conduit (6) at the beginning of the operation may be used for flat wall paints directly or may be retreated.

In Figure 2 a mixing tank (17) is shown provided with a conduit (18) leading to a separator or elutriator (19) where a very coarse fraction may be first separated out. The conduit (20) leads to a separator or elutriator (21) where a second fraction may be separated out and a conduit leads thence to a third elutriator where a third fraction may be separated out. From (23) the liquid goes to vessel (24) where a further deposit of pigment is obtained. This apparatus, while designed on the laboratory scale, may be built in larger units or otherwise modified for plant practice, in order to secure various fractions. In the present case, for example, the unclassified pigment in (17) would be agitated to form a suspension again and fed to the separating vessels when the operation is resumed; and the fraction in (19) would be very coarse and probably objectionable in both flat and gloss paints. The second fraction in (21) would be permissible in flat paints but objectionable in gloss paints. The third fraction in (23) would be moderately fine in particle size and suitable in flat paints, while the fourth fraction in (24) would be suitable in gloss paints and objectionable in flat paints. As previously shown in the foregoing description, the rate of flow of the liquid suspending medium will determine the character of the deposit where the apparatus is of a given predetermined character. The slurry becomes thicker as the operation progresses. The accumulation of particles in this laboratory type of apparatus requires the stopping of the operation for emptying of the vessels when the concentration gets too high. As stated, various forms of apparatus may be used. A series of separating vessels, each successive one yielding a finer product than the preceding unit, may be used to obtain as many different grades as desired, but for present practical purposes two grades are probably sufficient, one for enamel paints and one for flat paints.

The rate of upward flow necessary to eliminate particles above a given size will vary with the temperature. Under the conditions previously described the rate of settling practically doubles for a 30° C. rise in temperature. A temperature of about 15° C. or higher may be taken as the temperature for the rates of flow discussed, having due regard for increasing the rate with temperature increase.

The preferred liquid suspending agent is water, altho other liquids may be used where suitable. When using water, a dispersing agent such as sodium silicate should be used and the alkalinity should be controlled within certain ranges as aforesaid, in order to facilitate the suspension of the pigment. Any method of obtaining satisfactory dispersion so that size classification is possible may be used. A specially treated water or liquid containing dispersive media may be used for suspending the pigment. When using water in conjunction with a dispersing agent, the rate of flow is as aforesaid, preferably below 6 feet an hour; that is to say, a column of water containing the suspension should move upwardly at that rate in order to separate the lithopone into fine texture particles on one hand and into a coarse grade suitable for flat paints on the other hand. Where other liquid media are used, the rate would be adjusted according to the viscosity of the liquid, the concentration of the pigment therein, and the character of the dispersing agent, if any be used. The use of water, therefore, is illustrative merely of the way in which the new valuable lithopone product may be obtained.

When lithopone of the above described very fine texture is ground, it has been found to have less wear on the paint mills and permit of greater output. When incorporated in paint, the flowing properties are better, while no substantially large or gritty particles are visible, such as would be noticed when ordinary prior art lithopone is made up into a regular paint formula using standard vehicles and mixtures to obtain a paint film. Where my new fine texture lithopone is incorporated in a regular lithopone enamel, the latter when dried in the form of a film exhibits a remarkably smooth finish devoid in an almost absolute degree of any gritty or granular particles visible to the naked eye. In other words, the enamel film is wonderfully smooth and even, without surface irregularities visible to the unaided eye. This is to be sharply distinguished from prior art lithopones, as they do not exhibit any such effect when viewed with the unaided eye in the form of a paint or enamel film. When fumed zinc oxide is made up into a standard enamel and a film produced therefrom, it will exhibit a smoothness and fineness of texture of the same order as herein produced by the use of my new fine texture lithopone pigment. In the claims, therefore, I point out these new qualities of my lithopone fine texture pigment as herein described.

As many apparently widely different embodiments of this invention may be made without departing from the spirit thereof, it is to be understood that I do not limit myself to the foregoing examples or description except as generally indicated in the claims.

The lithopone pigment which settles out against the flow of the suspension of deflocculated calcined lithopone in my elutriation process is claimed per se in my co-pending application, Ser. #173,531, filed March 7, 1927, which is a continuation in part of the present application.

I claim:

1. A fine textured, calcined lithopone pigment which when ground in oil produces a paint which exhibits a smooth texture similar to that obtained with high grade fume pigments, such as zinc oxide, said lithopone paint when spread out presenting a smooth, unbroken and glossy surface, said lithopone pigment being substantially identical with the fraction of pigment which is recovered from the overflow in elutriating a deflocculated slurry of calcined lithopone at a rate less than five feet per hour.

2. A fine textured, calcined lithopone pigment which when ground in oil produces a paint which exhibits a smooth texture similar to that obtained with high grade fume pigments, such as zinc oxide, said lithopone paint when spread out presenting a smooth, unbroken and glossy surface, said lithopone pigment being substantially identical with the fraction of pigment which is recovered from the overflow in elutriating a sodium silicate deflocculated aqueous slurry having a pH of about 9.0 of calcined lithopone at a rate less than 12 feet per hour.

3. The process of separating calcined lithopone composed of particles of various sizes into two or more fractions in each of which the particles are substantially within a limited range of sizes, which comprises deflocculating an aqueous slurry of calcined lithopone and elutriating said deflocculated slurry.

4. The process of claim 3 in which sodium silicate is the deflocculating agent.

5. The process of preparing a lithopone pigment of uniformly fine texture which comprises deflocculating an aqueous slurry of calcined lithopone, adusting said slurry to form a suspension of not more than 1 part of lithopone to 8 parts of water, adjusting the pH of said suspension to a value of not less than 5.5, passing said adjusted suspension upwardly in an elutriator at a rate less than 5 feet per hour and recovering the pigment contained in the overflow.

6. The process of claim 5 with the additional step of recovering the fraction of the pigment which settles out against the flow of the suspension in the elutriator.

7. The process of preparing a lithopone pigment of uniformly fine texture which comprises adding sodium silicate to an aqueous slurry of calcined lithopone, adjusting said slurry to form a suspension of about 1 part of calcined lithopone to 20 parts of water, adjusting the pH of said suspension to about 9.0, passing said adjusted suspension upwardly in an elutriator at a rate less than 12 feet per hour and recovering the pigment contained in the overflow.

8. The process of claim 7 with the additional step of recovering the fraction of the pigment which settles out against the flow of the suspension in the elutriator.

In testimony whereof I affix my signature.

MARION L. HANAHAN.